(12) United States Patent
Oguma et al.

(10) Patent No.: US 10,484,184 B2
(45) Date of Patent: Nov. 19, 2019

(54) VEHICLE SYSTEM AND AUTHENTICATION METHOD

(71) Applicant: TOYOTA JIDOSHA KABUSHIKI KAISHA, Toyota-shi, Aichi (JP)

(72) Inventors: Hisashi Oguma, Kawasaki (JP); Tsuyoshi Toyama, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 496 days.

(21) Appl. No.: 15/258,576

(22) Filed: Sep. 7, 2016

(65) Prior Publication Data

US 2017/0111177 A1    Apr. 20, 2017

(30) Foreign Application Priority Data

Oct. 19, 2015   (JP) .................. 2015-205607

(51) Int. Cl.
  *H04L 29/06*    (2006.01)
  *H04L 9/32*    (2006.01)
  *G06F 21/57*    (2013.01)
  *H04L 29/08*    (2006.01)

(52) U.S. Cl.
  CPC .......... *H04L 9/3263* (2013.01); *G06F 21/575* (2013.01); *H04L 9/3247* (2013.01); *H04L 63/10* (2013.01); *H04L 67/12* (2013.01)

(58) Field of Classification Search
  CPC ..... H04L 9/3263; H04L 9/3247; H04L 67/12; H04L 63/10; G06F 21/575
  See application file for complete search history.

(56) References Cited

U.S. PATENT DOCUMENTS

| 5,949,877 A * | 9/1999 | Traw ............. G06F 21/10 380/30 |
| 9,215,228 B1 * | 12/2015 | Zhang ............. H04L 63/08 |
| 2002/0120876 A1 * | 8/2002 | Pearson ............. G06F 21/34 726/15 |

(Continued)

FOREIGN PATENT DOCUMENTS

JP    2007-074390 A    3/2007

OTHER PUBLICATIONS

Woo, Samuel et al. "A Practical Wireless Attack on the Connected Car and Security Protocol for In-Vehicle CAN." IEEE Transactions on Intelligent Transportation Systems 16 (Apr. 2015): 993-1006.*

*Primary Examiner* — Matthew T Henning
(74) *Attorney, Agent, or Firm* — Oliff PLC (57) ABSTRACT

A vehicle system includes a master ECU and a general ECU. The general ECU attaches a digital signature to transmission data including data (for example, a digest value of a program) and transmits the transmission data to the master ECU. The master ECU verifies the digital signature and the data and, when both the digital signature and the data are valid, determines that the general ECU is valid. The master ECU attaches a digital signature to transmission data including data of the master ECU and a session key and transmits the transmission data to the general ECU. The general ECU verifies the digital signature and the data and, when both the digital signature and the data are valid, the general ECU uses the session key included in the transmission data as a common key when performing subsequent communications.

13 Claims, 8 Drawing Sheets

(56) References Cited

U.S. PATENT DOCUMENTS

| | | | | |
|---|---|---|---|---|
| 2004/0185842 A1* | 9/2004 | Spaur | ............... | B60R 25/04 |
| | | | | 455/420 |
| 2005/0005097 A1* | 1/2005 | Murakawa | ......... | H04L 63/0442 |
| | | | | 713/156 |
| 2011/0138188 A1* | 6/2011 | Lee | ............... | G06F 21/57 |
| | | | | 713/187 |
| 2013/0212659 A1* | 8/2013 | Maher | ............... | H04L 63/06 |
| | | | | 726/6 |
| 2015/0052352 A1* | 2/2015 | Dolev | ............... | H04W 12/06 |
| | | | | 713/156 |
| 2017/0111177 A1* | 4/2017 | Oguma | ............... | G06F 21/575 |

* cited by examiner

VEHICLE SYSTEM AND AUTHENTICATION METHOD

BACKGROUND OF THE INVENTION

Field of the Invention

The present invention relates to authentication among ECUs in a vehicle system including a plurality of ECUs.

Description of the Related Art

In recent years, the number of computers (electronic control units (ECUs)) mounted on a vehicle has increased and the ECUs cooperate with each other to perform sophisticated control. Such a vehicle network system may conceivably become a target of attacks such as contamination by illegal data, illicit rewriting of an ECU program, replacement with an illegal ECU, and addition of an illegal ECU.

As a countermeasure against such attacks, the AUTOSAR standard proposes message authentication using a common key. For example, when starting up an engine, a challenge response authentication using a common key is performed and a session key is distributed when the authentication is successful. Subsequently, message authentication with a message authentication code (MAC) using the session key is performed upon message transmission.

In addition, Patent Document 1 below discloses construction of an ad hoc network by mutually valid devices, in which the devices respectively store an ad hoc network ID, an exclusion list specifying specific devices to be excluded from an ad hoc network identified by the ad hoc network ID, and a device certificate generated by a certification authority, and exchange device certificates with each other to check whether the devices are capable of constructing an ad hoc network. In this case, by not performing mutual authentication with devices registered in the exclusion list, the devices registered in the exclusion list are prevented from joining the network.

Patent Document 1: Japanese Patent Application Laid-open No. 2007-074390

SUMMARY OF THE INVENTION

With authentication using a common key such as in the case of AUTOSAR, since the common key must be distributed in advance, how the common key is to be introduced to a new ECU becomes an issue particularly when an ECU fails and must be replaced. While ECUs to which the common key is introduced in advance can conceivably be prepared, this means that an enormous amount of replacement ECUs must be prepared in advance. In addition, adopting a mechanism that allows a common key to be rewritten at a later date may create a security hole.

With the method described in Patent Document 1, since devices not permitted to join the network are specified using an exclusion list, the exclusion list must be changed whenever necessary. When the exclusion list is not updated in a timely manner, an illicit device that should not be permitted to join the network may end up joining the network.

The present invention has been made in consideration of the problems described above and an object thereof is to provide a technique for authentication in a vehicle system which can be readily applied even when replacing an ECU.

A first aspect of the present invention is a vehicle system constituted by a master ECU and a general ECU, in which the master ECU and the general ECU perform mutual authentication using a public key encryption system. In doing so, validity of an ECU is verified by including specified data related to the ECU in an electronic certificate.

In the present aspect, the master ECU is provided with a private key of the master ECU (a master ECU private key) and an electronic certificate (a general ECU electronic certificate) which corresponds to a public key of the general ECU (a general ECU public key). The general ECU electronic certificate includes specified data related to the general ECU. In addition, the general ECU is provided with a private key of the general ECU (a general ECU private key) and an electronic certificate (a master ECU electronic certificate) which corresponds to a public key of the master ECU (a master ECU public key). The master ECU electronic certificate includes specified data related to the master ECU.

The general ECU attaches a digital signature using the general ECU private key to transmission data including the specified data of the general ECU and transmits the transmission data to the master ECU.

The master ECU verifies, using the general ECU electronic certificate, the transmission data attached with the digital signature and transmitted from the general ECU and, at the same time, verifies whether the specified data included in the transmission data matches the specified data included in the general ECU electronic certificate. When both the transmission data and the specified data are determined to be valid, the general ECU is determined to be valid.

A successful verification of the digital signature shows that a transmission source of the transmission data and contents of the data are valid. In other words, it is shown that no spoofing and tampering have been performed. In addition, the transmitted specified data matching the specified data stored in the electronic certificate shows that a program of the general ECU has not been tampered with.

Furthermore, after the validity of the general ECU is confirmed, the master ECU attaches a digital signature using the master ECU private key to transmission data including the specified data of the master ECU and a session key and transmits the transmission data to the general ECU. When transmitting the session key, the session key is favorably transmitted encrypted so that only the general ECU that is a transmission destination can read the session key. Specifically, the session key is favorably transmitted encrypted using the public key of the general ECU. The session key is to be used after mutual authentication is completed as a common key for communication between the master ECU and the general ECU.

The general ECU verifies, using the master ECU electronic certificate, the transmission data attached with the digital signature and transmitted from the master ECU and, at the same time, verifies whether the specified data included in the transmission data matches the specified data included in the master ECU electronic certificate. When both the transmission data and the specified data are determined to be valid, the master ECU is determined to be valid. This process is similar to the validity verification of the general ECU by the master ECU. When validity of the master ECU can be confirmed, the general ECU determines that the master ECU is valid and uses the session key included in the transmission data as a common key for future communications.

Accordingly, the master ECU and the general ECU can perform mutual authentication and exchange a session key (a common key) to be used in subsequent communications. In the present aspect, a public key encryption system is used and the master ECU and the general ECU store electronic certificates. Since an electronic certificate itself is information that need not be concealed, the electronic certificate can be stored in an ordinary memory. Therefore, when replacing an ECU, since only an electronic certificate stored in another ECU and related to the replacement object ECU need be updated, replacement of an ECU can be readily performed. In other words, there is no need to prepare replacement ECUs in excess and a mechanism which may provide a security hole need not be introduced in order to replace an ECU.

In the present aspect, favorably, the general ECU exists in plurality, the master ECU is provided with a general ECU electronic certificate corresponding to each of the general ECUs, the master ECU transmits a same key as a session key to the respective general ECUs, and the general ECUs use the session key as a common key for communication between the master ECU and other general ECUs.

Accordingly, each general ECU can share the session key by simply performing mutual authentication with the master ECU. In other words, the respective general ECUs can authenticate one another via authentication with the master ECU.

In the present aspect, specified data related to the general ECU may be a valid digest value (a hash value) of an execution program of the general ECU. In this case, the general ECU may calculate a digest value of an execution program, attach a digital signature using the general ECU private key to transmission data including the digest value, and transmit the transmission data to the master ECU.

Accordingly, when a program of the general ECU has been tampered with, since the digest value included in the transmission data does not match the digest value included in the electronic certificate, the master ECU can detect that the execution program of the general ECU has been tampered with.

In addition, in the present aspect, specified data related to the general ECU may be an ID (uniquely identifiable data) of the general ECU. In this case, after confirming integrity of an execution program using a secure boot, the general ECU may attach a digital signature using the general ECU private key to transmission data including the ID of the general ECU and transmit the transmission data to the master ECU.

As described above, integrity of the execution program of the general ECU can also be ensured by transmitting the ID of the general ECU after the general ECU confirms that the execution program has not been tampered with using a secure boot.

In the present aspect, since electronic certificates are used, each ECU stores a root public key that is a public key of a root certificate authority. Each ECU may store a root public key in an unrewritable memory or in a rewritable memory. When the root public key need not be updated, the root public key may be stored in an unrewritable memory. On the other hand, when the root public key needs to be updated, the root public key must be stored in a rewritable memory. In this case, in order to prevent tampering of the root public key, a digital signature may be created using a private key (a master ECU private key or a general ECU private key) of the host device and store the root public key in association with the digital signature.

In the present aspect, a master ECU need not necessarily be provided with a general ECU electronic certificate in advance, a general ECU need not necessarily be provided with a master ECU electronic certificate in advance, and electronic certificates may be distributed in a mutual authentication process. In this case, the master ECU must be provided with a master ECU electronic certificate in advance and the general ECU must be provided with a general ECU electronic certificate in advance. Specifically, when the general ECU does not have the master ECU electronic certificate, the general ECU transmits the general ECU electronic certificate together with the transmission data attached with the digital signature, to the master ECU, and the master ECU verifies the general ECU electronic certificate using a root public key and stores the general ECU electronic certificate when the general ECU electronic certificate is valid. In addition, when the master ECU does not have the general ECU electronic certificate, the master ECU transmits the master ECU electronic certificate together with the transmission data attached with the digital signature, to the general ECU, and the general ECU verifies the master ECU electronic certificate using the root public key and stores the master ECU electronic certificate when the master ECU electronic certificate is valid.

According to such a configuration, even when each ECU in a vehicle system does not possess an electronic certificate of another ECU in advance, mutual authentication between ECUs can be performed. Therefore, when replacing an ECU, an operation for updating an electronic certificate of another ECU can be omitted.

Moreover, the present invention can be considered as a vehicle system including at least a part of the means described above. The present invention can also be considered as an authentication method of a vehicle system in which at least a part of the means described above is executed. Furthermore, the present invention can also be considered a computer program that causes the method to be executed by a computer or a computer-readable storage medium that non-transitorily stores the computer program. The respective means and processes described above can be combined with one another in any way possible to constitute the present invention.

According to the present invention, an authentication process in a vehicle system can be readily applied even when replacing an ECU.

DESCRIPTION OF THE EMBODIMENTS

First Embodiment

<Configuration>
A vehicle system according to a first embodiment will be described with reference to FIG. 1. The vehicle system is constituted by a plurality of computers (ECUs) connected to a CAN bus system. Although four ECUs including a master ECU (100m), a general ECU a (100a), a general ECU b (100b), and a general ECU c (100c) are connected in FIG. 1, the number of ECUs in the vehicle system is not particularly limited.

Each ECU 100 has a processor (a processing device), a security chip (a tamper resistant device), a memory, a communication device, and the like. Moreover, the security chip functions independently of other processors and is capable of safely storing and executing programs and data. While the master ECU 100m does not particularly differ from general ECUs in terms of hardware configuration, an ECU with abundant processing resources is favorably used as the master ECU.

Since the respective ECUs have approximately similar functional configurations, the master ECU 100m will be described as an example. The master ECU 100m stores an execution program 111m and a root certificate 112m in a read-only memory (a ROM) 110m. The execution program 111m is a program describing functions to be provided by the master ECU m after system startup. The root certificate 112m is an electronic certificate corresponding to a public key of a root certificate authority.

In addition, the master ECU 100m stores an encryption engine 121m and a private key 122m in a tamper resistant device 120m. The encryption engine 121m provides functions such as generation of a pair of a private key and a public key, output of a public key, an encryption process, a decryption process, attachment of a digital signature, verification of a digital signature, and computation of a hash value. In addition, the private key 122m is a private key of the master ECU 100m.

Furthermore, the master ECU 100m stores electronic certificates of all general ECUs in the system (in this case, electronic certificates 131a, 131b, and 131c corresponding to the general ECU a, the general ECU b, and the general ECU c) in a flash memory (readable/writable memory) 130m.

Moreover, a master ECU and a general ECU differ from each other in types of electronic certificates stored in a flash memory. While a master ECU stores electronic certificates of all general ECUs in a flash memory as described above, a general ECU only stores an electronic certificate 131m of the master ECU in a flash memory.

<Electronic Certificate>

Figure 2:
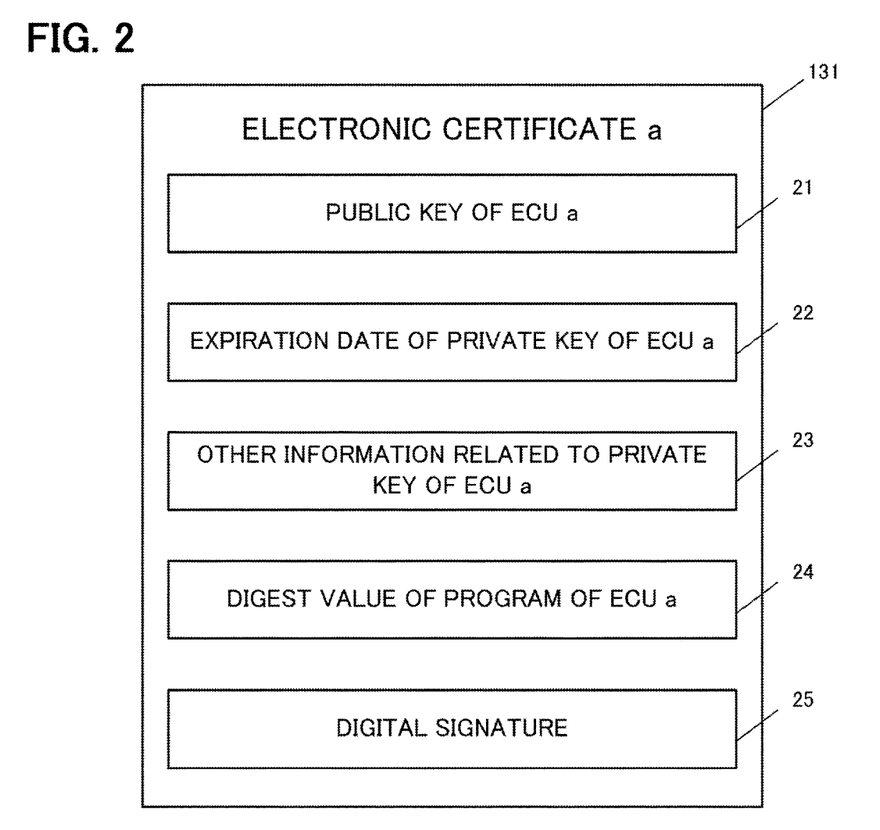
FIG. 2 is a diagram showing a format of an electronic certificate according to the first embodiment.

FIG. 2 is a diagram showing a format of an electronic certificate. FIG. 2 shows a format of an electronic certificate corresponding to a public key of the general ECU a as an example. The electronic certificate 131 of the general ECU a is constituted by a public key 21 of the general ECU a, an expiration date 22 of a private key of the general ECU a, other information 23, a digest value 24 of an authentic program 111a to be stored in the general ECU a, and a digital signature 25 with respect to all of these pieces of information. For the electronic certificate 131, for example, the X.509 v3 standard can be adopted. Since this standard provides an extended region, the digest value 24 of the program can be stored in the extended region.

The digest value is also called a summary value or a hash value and is a value of fixed length obtained using a prescribed calculation procedure from source data. Even a small difference in source data may result in a significant difference in digest values. Although a same digest value may sometimes be obtained from different pieces of data (collision of hash values), since there is no way to efficiently retrieve source data for obtaining a same digest value, identity of data can be verified using a digest value.

<Authentication Procedure>

Next, with reference to the flow chart in FIG. 3, a flow of a mutual authentication process between ECUs in the vehicle system will be described. In the present embodiment, each general ECU performs mutual authentication with the master ECU to exchange a session key (a common key). By distributing a same session key to all general ECUs, the master ECU enables communication using the session key to be performed among all ECUs in the system.

Figure 3:
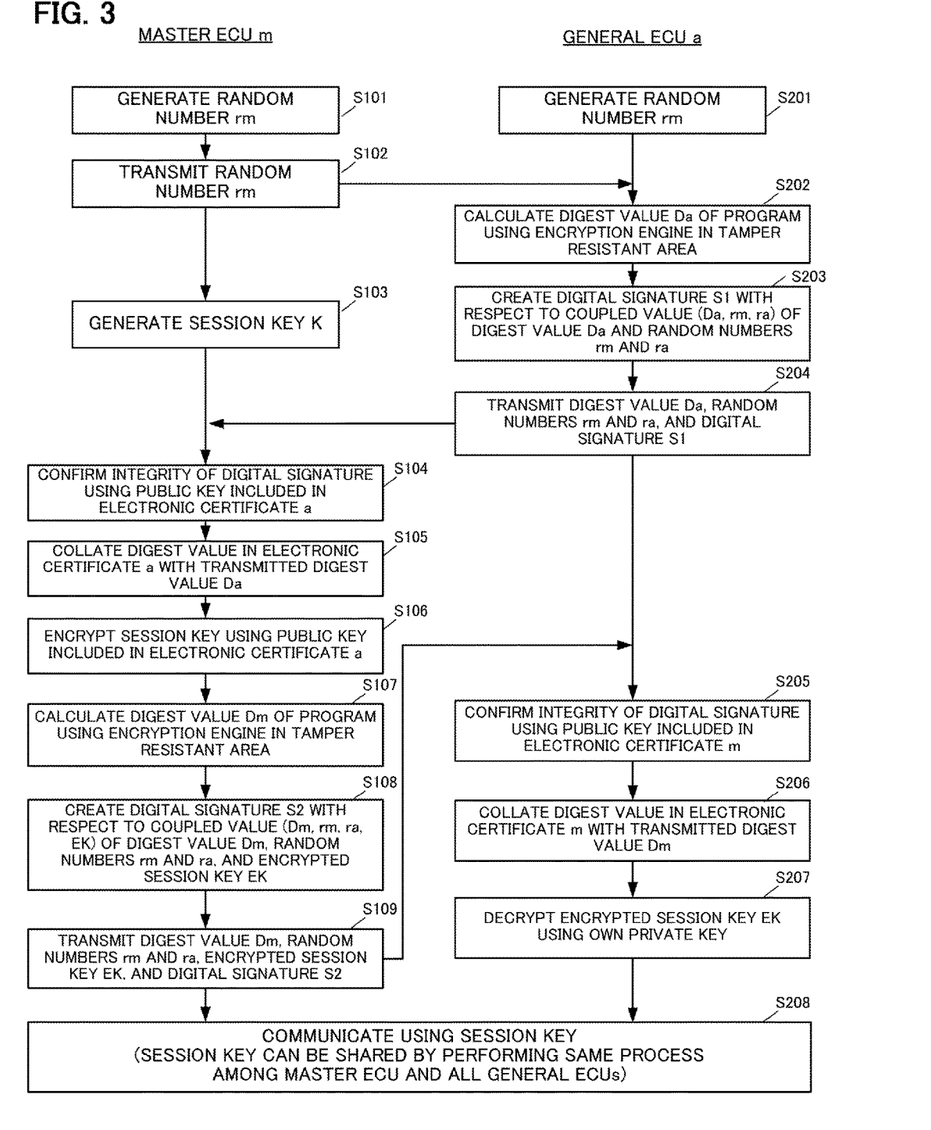
FIG. 3 is a flow chart showing a flow of a mutual authentication process of ECUs according to the first embodiment.

FIG. 3 represents an example of a case where mutual authentication is performed between the master ECU m and the general ECU a. This process is favorably performed at timings of, for example, shipment of a vehicle from a factory, update of a common key, and replacement of an ECU. However, the process may be performed every time the vehicle system starts up.

First, the master ECU m generates a random number $r_m$ using the encryption engine 121m (S101). In a similar manner, the general ECU a generates a random number $r_a$ using the encryption engine 121a (S201). These random numbers are generated to ensure that subsequent message exchange processes are authentication processes in a present session. These random numbers need not necessarily be used and may be omitted.

The master ECU m transmits the random number $r_m$ to the general ECU a (S102). The general ECU a uses the encryption engine 121a in the tamper resistant device 120a to calculate a digest value $D_a$ of the execution program 111a (S202). In addition, the general ECU a uses the encryption engine 121a to create a digital signature S1 with respect to a coupled value of the digest value $D_a$, the random number $r_m$, and the random number $r_a$ (S203). The digital signature S1 is data obtained by encrypting a hash value of the coupled value of the digest value $D_a$, the random number $r_m$, and the random number $r_a$ with the private key 122a of the general ECU a. The general ECU a transmits the digest value $D_a$, the random number $r_m$, the random number $r_a$, and the digital signature S1 to the master ECU m (S204).

The master ECU m generates a session key K using the encryption engine 121m (S103). Specifically, the session key K is a random number. As described above, since one session key is shared in the vehicle system, generating a session key once during the mutual authentication process may suffice.

When the master ECU m receives a message with a digital signature from the general ECU a, the master ECU m confirms integrity of the digital signature using the electronic certificate of the general ECU a (S104). Specifically, a digest value of the received digest value $D_a$, random number $r_m$, and random number $r_a$ is obtained and the digital signature is decrypted with a public key (included in the electronic certificate) of the general ECU a. When these values match, it can be guaranteed that the transmission source of the data is the general ECU a and the transmission data has not been tampered with. When integrity of the digital signature cannot be confirmed, since there is a possibility that spoofing or tampering has been performed, the process is aborted.

Next, the master ECU m collates whether the digest value $D_a$ of the program of the general ECU a included in the transmission data matches the digest value 24 included in the electronic certificate of the general ECU a (S105). Matching digest values indicate that the program 111a stored in the general ECU a is authentic or, in other words, the program 111a has not been subjected to tampering and the like. Due to the processes so far, the master ECU m can confirm that the general ECU a is valid. On the other hand, when the digest values do not match, since there is a possibility that the program has been tampered with, the process is aborted.

Using the encryption engine 121m, the master ECU m encrypts the session key K generated in step S103 with the public key (included in the electronic certificate) of the general ECU a to obtain an encrypted session key EK (S106). In addition, the master ECU m uses the encryption engine 121m to calculate a digest value $D_m$ of the program 111m (S107). Furthermore, the master ECU m uses the encryption engine 121m to create a digital signature S2 with respect to a coupled value of the digest value $D_m$, the random number $r_m$, the random number $r_a$, and the encrypted session key EK (S108). The digital signature S2 is data obtained by encrypting a hash value of the coupled value of the digest value $D_m$, the random number $r_m$, the random number $r_a$, and the encrypted session key EK with the private key 122m of the master ECU m. The master ECU m transmits the digest value $D_m$, the random number $r_m$, the random number $r_a$, the encrypted session key EK, and the digital signature S2 to the general ECU a (S109).

When the general ECU a receives a message with a digital signature from the master ECU m, the general ECU a confirms integrity of the digital signature using the electronic certificate of the master ECU m (S205). Specifically, a digest value of the received digest value $D_m$, random number $r_m$, random number $r_a$, and encrypted session key EK is obtained and the digital signature is decrypted with a public key (included in the electronic certificate) of the master ECU m. When these values match, it can be guaranteed that the transmission source of the data is the master ECU m and the transmission data has not been tampered with. When integrity of the digital signature cannot be confirmed, since there is a possibility that spoofing or tampering has been performed, the process is aborted.

Next, the general ECU a collates whether the digest value $D_m$ of the program of the master ECU m included in the transmission data matches the digest value 24 included in the electronic certificate of the master ECU m (S206). Matching digest values indicate that the program 111m stored in the master ECU m is authentic or, in other words, the program 111m has not been subjected to tampering and the like. Due to the processes so far, the general ECU a can confirm that the master ECU m is valid. On the other hand, when the digest values do not match, since there is a possibility that the program has been tampered with, the process is aborted.

When the validity of the master ECU m is confirmed, the general ECU a decrypts the encrypted session key EK using the private key 122a of the general ECU a itself (S207). Accordingly, the session key K can be shared between the master ECU m and the general ECU a. Subsequently, safe communication is performed using the session key between the master ECU m and the general ECU a. For example, by generating and transmitting a message authentication code (a MAC) of a transmission message using the session key, safety of communication can be secured.

Moreover, as described earlier, each general ECU performs mutual authentication with the master ECU m and receives the same session key K from the master ECU m. Therefore, since the same session key K can be shared among all ECUs in the vehicle system, communication using the session key K can also be performed in communication among the general ECUs.

Performing the authentication process described above enables a public key encryption system to be used to confirm that the ECUs in the vehicle system are valid and that the execution program is authentic. In addition, a session key can be shared among mutually authenticated ECUs.

<Method of Creating and Distributing Electronic Certificate>

Hereinafter, a method of creating and distributing an electronic certificate in the vehicle system will be described.

Figure 4A:
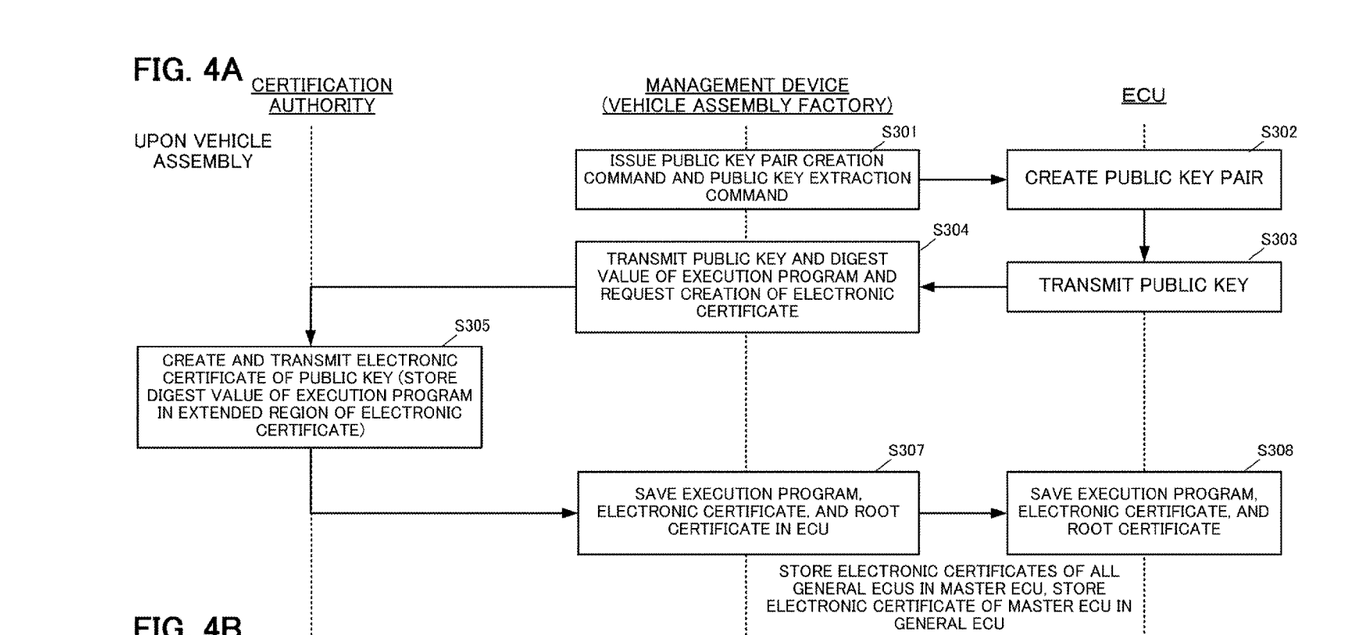
FIG. 4A is a diagram illustrating a method of creating and distributing an electronic certificate during vehicle assembly according to the first embodiment.

FIG. 4A is a diagram illustrating a method of creating and distributing an electronic certificate during vehicle assembly. A management device at a vehicle assembly factory issues a public key pair creation command and a public key extraction command to all ECUs mounted to a single vehicle (S301). An ECU having received these commands uses an encryption engine to generate a pair of a private key and a public key (S302), stores the pair in a memory, and transmits the public key to the management device (S303). The management device transmits the public key of the ECU and a digest value of an authentic program to be mounted to the ECU to a certification authority (a root certificate authority) and requests creation of an electronic certificate (S304). The certification authority creates an electronic certificate corresponding to the received public key and program digest value and transmits the electronic certificate to the management device (S305). As shown in FIG. 2, the created electronic certificate includes the public key and the program digest value of the ECU and is attached with a digital signature for the entirety of the information and which is created using a private key of the certification authority. Upon receiving the electronic certificate from the certification authority, the management device saves an execution program, the electronic certificate, and a root certificate in memories of the ECUs (S307, S308). As the execution program, an execution program corresponding to each ECU is stored in a ROM. In addition, the electronic certificate is stored in a flash memory. Furthermore, the electronic certificates of all general ECUs are stored in the master ECU but only the electronic certificate of the master ECU is stored in a general ECU. The root certificate is an electronic certificate corresponding to a public key of the certification authority. The root certificate is stored in the ROM of each ECU.

Figure 1:
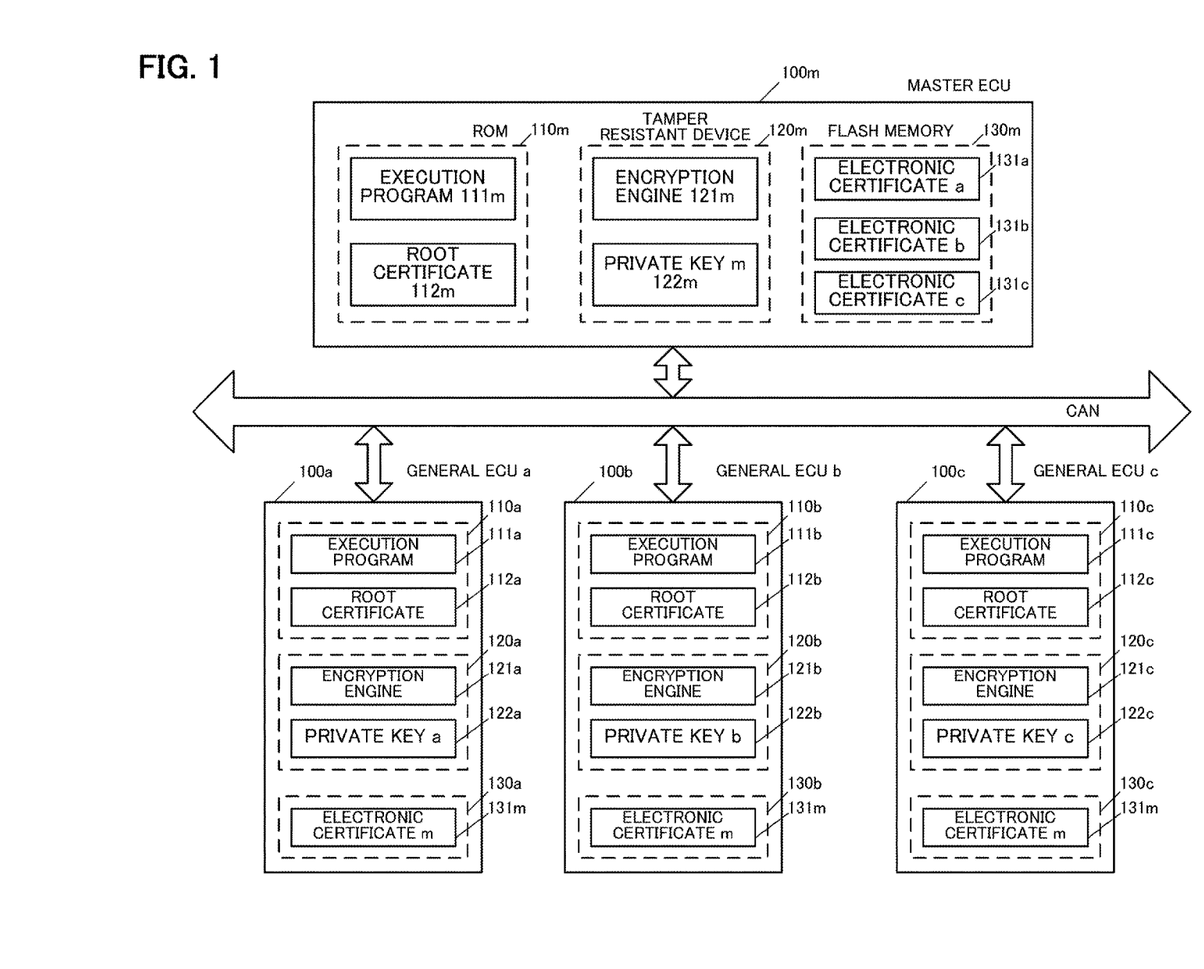
FIG. 1 is a schematic system diagram according to a first embodiment.

Accordingly, a configuration of the vehicle system such as that shown in FIG. 1 can be constructed.

Figure 4B:
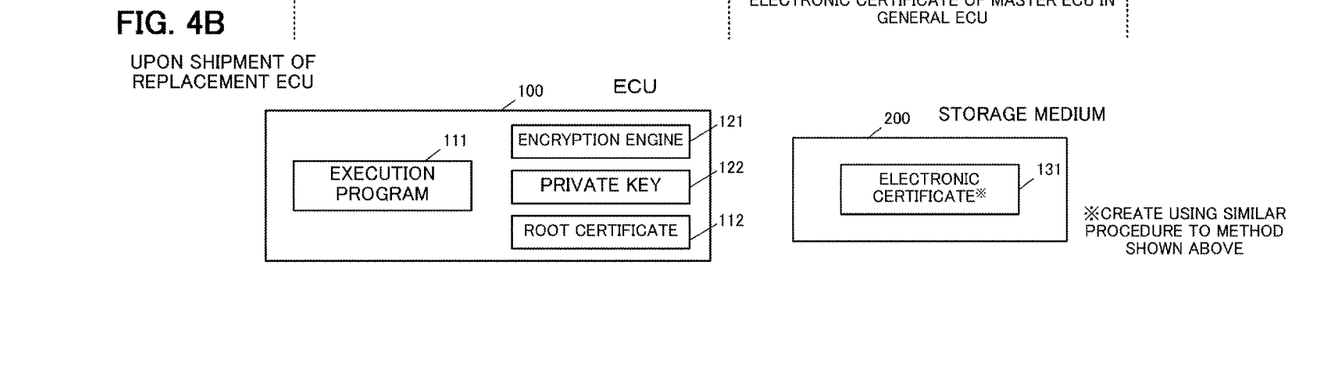
FIG. 4B is a diagram illustrating a method of creating and distributing an electronic certificate during shipment of a replacement ECU.

A method of creating and distributing a replacement ECU will now be described with reference to FIG. 4B. Even in this case, an electronic certificate including a program digest value of a replacement ECU is created by making a request to the certification authority in accordance with the method of steps S301 to S306 shown in FIG. 4A. As shown in FIG. 4B, the management device saves an execution program 111 and a root certificate 112 in a replacement ECU 100 and, at the same time, saves an electronic certificate 131 of the replacement ECU in a storage medium 200 (a flash memory, a CD-ROM, or the like) that is a separate medium to the ECU. The replacement ECU 100 is shipped together with the storage medium 200 storing the electronic certificate 131.

Next, a procedure of replacing an ECU in the vehicle system will be described.

When the replacement ECU is a general ECU, the electronic certificate of the replacement ECU stored in the storage medium 200 is transmitted to the master ECU in the vehicle system to update the electronic certificate in the flash memory of the master ECU. Moreover, the master ECU can verify the validity of the electronic certificate with a root certificate. In addition, the replacement ECU receives the electronic certificate from the master ECU and stores the electronic certificate in a flash memory. The validity of the electronic certificate can be verified in a similar manner as described above using a root certificate.

When the replacement ECU is a master ECU, the electronic certificate of the replacement ECU stored in the storage medium 200 is transmitted to all general ECUs in the vehicle system to update the electronic certificate in the flash memories of the general ECUs. In addition, the replacement ECU receives electronic certificates from all of the general ECUs in the vehicle system and stores the electronic certificates in a flash memory. The validity of the electronic certificates can be verified in a similar manner as described above with a root certificate.

In this manner, when an illegal ECU is mounted, since verification of an electronic certificate thereof fails, mounting of the illegal ECU can be detected. In addition, when an ECU is a valid ECU but a program stored therein has been tampered with and is no longer valid, the program can be detected by a mutual authentication process (FIG. 3). Furthermore, since an electronic certificate need only be stored in a flash memory and need not be stored in a tamper resistant device, an interface that may become a security hole need not be prepared in order to replace an ECU. Moreover, since communication (hotline) need not be performed with a certification authority when replacing an ECU, an ECU can be readily replaced.

Second Embodiment

In the first embodiment, the authenticity of a program is confirmed by storing a program digest value in an electronic certificate and transmitting a program digest value of a host device to an ECU that is an authentication destination in an authentication process. The present embodiment differs from the first embodiment in a method of verifying the validity of a program. In the present embodiment, each ECU verifies the validity of a program using a secure boot.

Since a configuration of an ECU in the second embodiment is approximately similar to that in the first embodiment (FIG. 1), a detailed description thereof will be omitted. A difference from the first embodiment is in data included in an electronic certificate.

Figure 5:
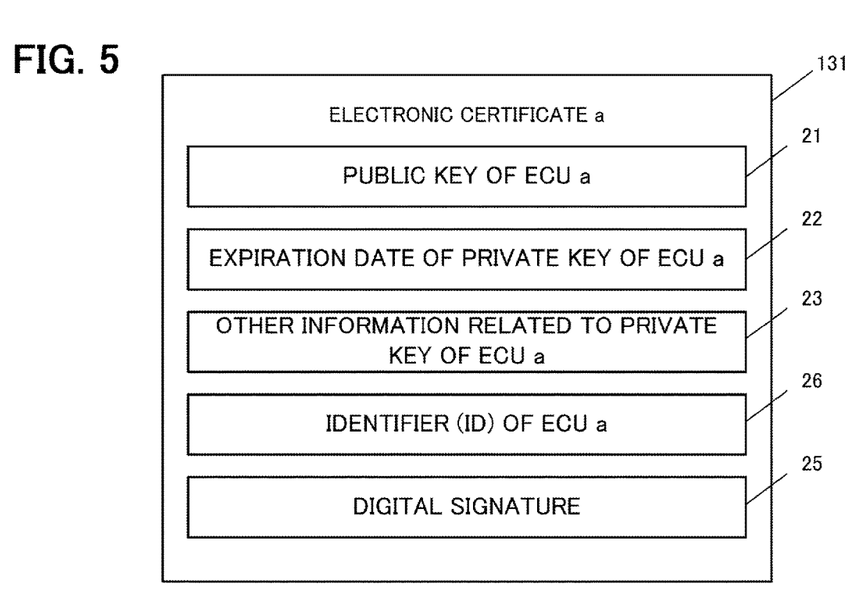
FIG. 5 is a diagram showing a format of an electronic certificate according to a second embodiment.

FIG. 5 is a diagram showing a format of an electronic certificate according to the second embodiment. While the digest value 24 of a valid program to be stored in an ECU is stored in an extended region of the electronic certificate 131 in the first embodiment, in the present embodiment, an identifier (ID) 26 of an ECU is stored instead. An identifier of an ECU may have any format as long as the identifier is data enabling an ECU to be uniquely identified.

In addition, in the present embodiment, since the validity of a program is confirmed by a secure boot, a valid digest value of a program to be stored in an ECU is stored in a tamper resistant device. The program digest value is the same as that stored in the extended region of an electronic certificate in the first embodiment.

Figure 6:
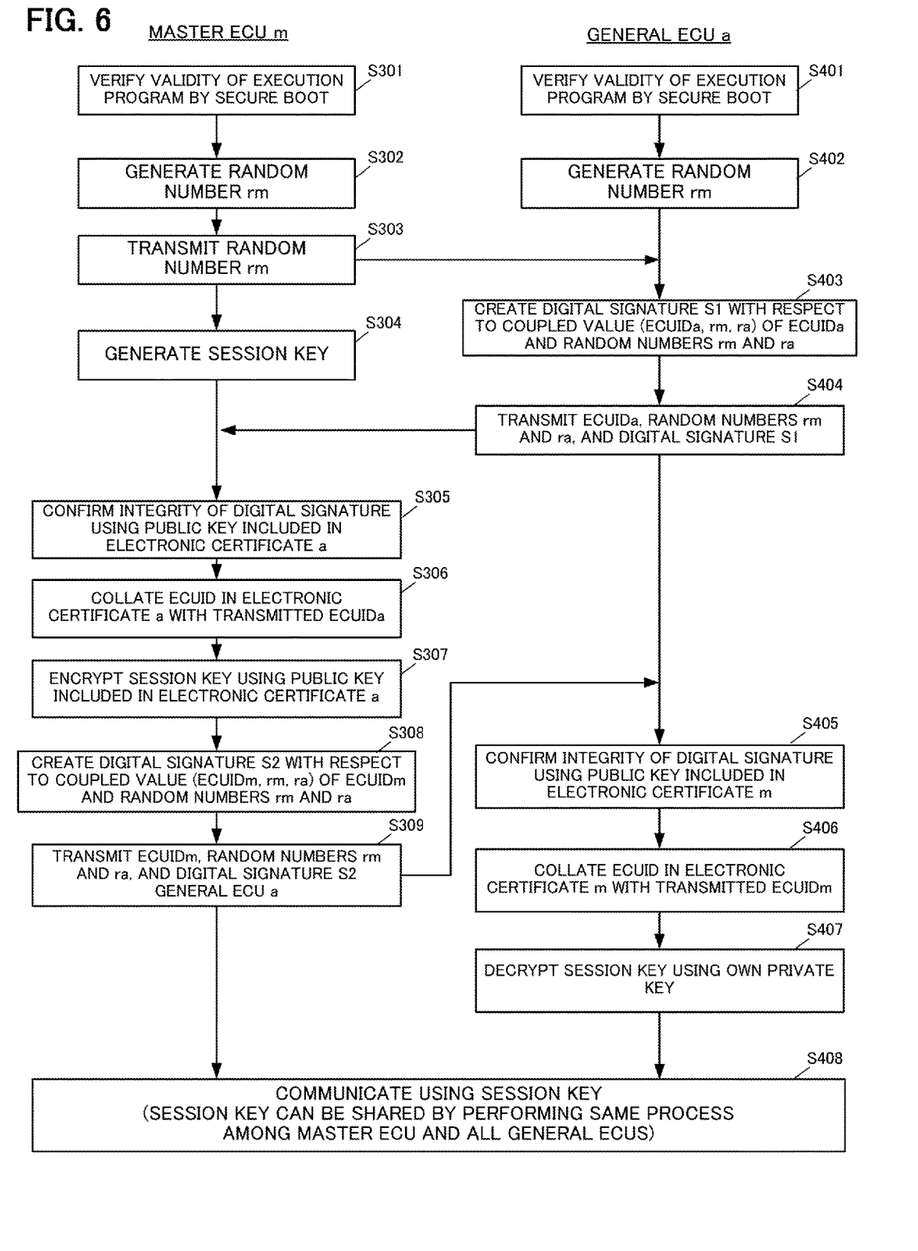
FIG. 6 is a flow chart showing a flow of a mutual authentication process of ECUs according to the second embodiment.

FIG. 6 is a flow chart showing a flow of a mutual authentication process among ECUs in a vehicle system according to the second embodiment. In the present embodiment, first, the validity of an execution program is respectively verified using a secure boot method by the master ECU m and the general ECU a (S301, S401). In a secure boot, an encryption engine calculates a digest value of a program stored in a memory and compares the digest value with a digest value of a valid program stored in the tamper resistant device. When the digest values match each other, it is determined that the program is valid, but when the digest values do not match each other, it is determined that the program is invalid. The master ECU m and the general ECU a execute processes subsequent to steps S301 and S401 only when the program is determined to be valid by the secure boot.

Subsequent processes are basically similar to those in the first embodiment and a difference is that an ECU identifier is transmitted instead of calculating and transmitting a program digest value. For example, in steps S403 and S404, the general ECU a creates a digital signature S1 with respect to a coupled value of an ECUIDa of the host device, a random number $r_m$, and a random number $r_a$, and transmits these pieces of data and the digital signature to the master ECU. The integrity verification process (S305) of the digital signature by the master ECU m is similar to that in the first embodiment. In addition, the verification of validity of an ECU by determining whether the data (ECUIDa) transmitted from the general ECU a that is an authentication destination matches data stored in the electronic certificate in step S306 is the same as in the first embodiment. However, there is a difference in used data between a digest value of a program and an identifier of an ECU. The process of transmission from the master ECU m to the general ECU a (steps S308 and S309 and S405 to S407) is also similar to that described earlier.

Due to such processes, a similar effect to the first embodiment can be produced. Moreover, a method of creating and distributing an electronic certificate upon vehicle assembly, a method of creating and distributing a replacement ECU, and a replacement procedure are similar to those in the first embodiment.

Third Embodiment

In the first and second embodiments described above, when replacing an ECU, an operation is performed to install an electronic certificate of a replacement ECU to other ECUs in a vehicle system. The present embodiment enables work load during ECU replacement to be reduced by omitting this operation.

Figure 7A:
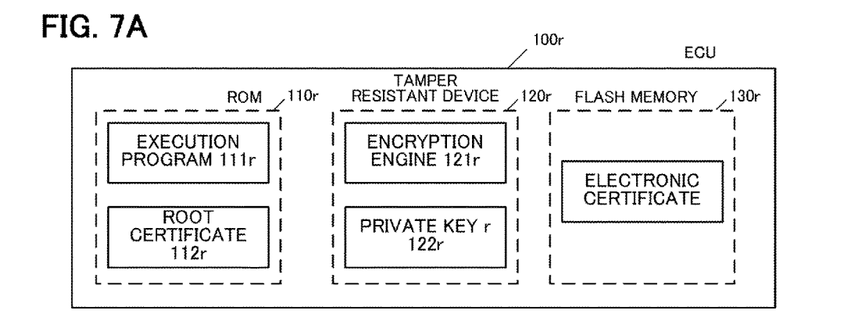
FIG. 7A shows a configuration of a replacement ECU according to a third embodiment.

FIG. 7A is a diagram showing a configuration of a replacement ECU r according to the present embodiment. While an electronic certificate of the replacement ECU r is stored in a storage medium that differs from the ECU main body in the first embodiment (FIG. 4B), in the present embodiment, an electronic certificate 131r of the replacement ECU r is stored in a flash memory 130r of the ECU r.

In the present embodiment, when replacing an ECU, only a step of simply replacing the ECU is performed and a process of updating an electronic certificate of another ECU in the vehicle system is not performed. Therefore, immediately after replacement of the ECU, the replacement ECU r does not retain an electronic certificate of another ECU and other ECUs do not retain the electronic certificate of the replacement ECU r.

Figure 7B:
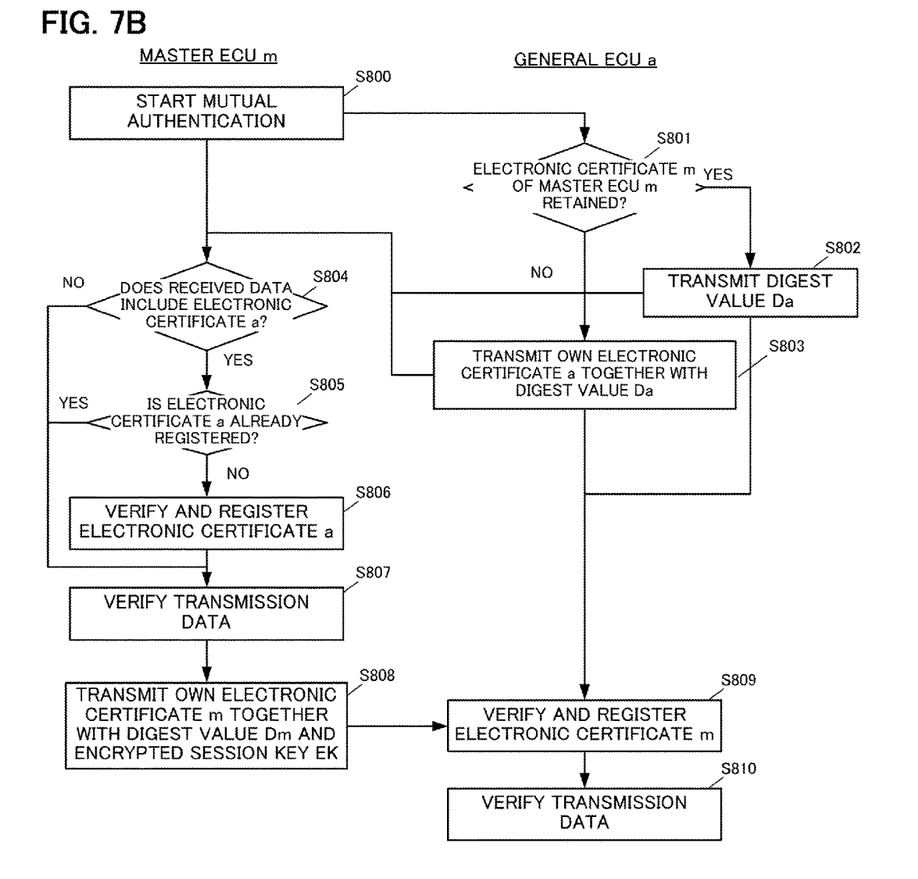
FIG. 7B is a flow chart showing a flow of a mutual authentication process of ECUs according to the third embodiment.

FIG. 7B is a flow chart showing a flow of a mutual authentication process between ECUs (in this case, between the master ECU m and the general ECU a) according to the present embodiment. In the present embodiment, since an ECU may not regain an electronic certificate of an authentication partner, an additional process is necessary as compared to the first embodiment. Moreover, regardless of the replaced ECU being the master ECU m or the general ECU a (or both), this process enables mutual authentication between ECUs to be performed. In addition, the flow chart in FIG. 7B omits or simply shows a part of contents of processes shown in FIG. 3 so as to highlight differences from the processes according to the first embodiment (FIG. 3).

First, the master ECU starts a mutual authentication process (S800). Specifically, the master ECU m generates a random number $r_a$ and transmits the random number $r_a$ to the general ECU a in a similar manner to step S101. When the mutual authentication process starts, the general ECU a determines whether or not an electronic certificate m of the master ECU m is stored in a memory (S801).

When the general ECU a retains the electronic certificate m (yes in S801), a digest value $D_a$ of an execution program 111r of a general ECU r and random numbers $r_m$ and $r_a$, and a digital signature S1 with respect to a coupled value of these values are transmitted to the master ECU m in a similar manner to the first embodiment (S802). This process is similar to the process of steps S202 to S204 shown in FIG. 3.

When the general ECU a does not retain the electronic certificate m (no in S801), on the other hand, an electronic certificate a of the host device is transmitted in addition to the digest value $D_a$ of the execution program 111r of the general ECU r and the random numbers $r_m$ and $r_a$ (S803). In doing so, the electronic certificate a may or may not be considered an object of the digital signature S1.

When the master ECU m receives data including the digest value $D_a$ of the program from the general ECU a, the master ECU m determines whether the received data includes the electronic certificate a (more accurately, an electronic certificate of a data transmission source) (S804). When the electronic certificate a is included in the received data (yes in S804), the master ECU m determines whether or not the electronic certificate a is already registered (retained in a memory) (S805). When the master ECU m does not retain the electronic certificate a (no in S805), the master ECU m confirms validity of the electronic certificate a with the encryption engine 121m using a root certificate 112m and, once validity is confirmed, registers the electronic certificate a (stores the electronic certificate a in a memory) (S806). Moreover, when the validity of the electronic certificate a cannot be confirmed, the authentication process is aborted and subsequent processes are not performed.

On the other hand, when the electronic certificate a is not included in the data received by the master ECU m (no in S804) or when the electronic certificate a included in the received data is already registered (yes in S805), the process of step S806 is not performed.

Next, the master ECU m confirms validity of the data received from the general ECU a using the electronic certificate a (S807). Specifically, verification of a digital signature and verification of a digest value (comparison of the digest value included in the received data and the digest value included in the electronic certificate a) are performed. These processes are similar to the processes of steps S104 and S105 shown in FIG. 3.

Once the validity of the general ECU a is confirmed, the master ECU m attaches a digital signature to the electronic certificate m of the host device and transmits the electronic certificate m together with the digest value $D_m$ of the program 111m of the host device, the random numbers $r_m$ and $r_a$, and the encrypted session key EK (S808). These processes are similar to the processes of steps S106 to S109 shown in FIG. 3 and step S803 described above. Moreover, the electronic certificate m need not always be transmitted and may be transmitted only when the electronic certificate a of the general ECU a is included in data transmitted from the general ECU a. This is because, otherwise, the general ECU a retains the electronic certificate m.

When the general ECU a receives data including the electronic certificate m from the master ECU m, the general ECU a checks the validity of the electronic certificate m and, once the validity is confirmed, registers the electronic certificate m (stores the electronic certificate m in a memory) (S809). In addition, the general ECU a checks the validity of the data transmitted from the master ECU m using the electronic certificate m and, once the validity is confirmed, registers the electronic certificate m (stores the electronic certificate m in a memory) (S809). This process is similar to the process of steps S205 to S207 shown in FIG. 3. Moreover, when the validity of the electronic certificate m cannot be confirmed, the authentication process is aborted and subsequent processes are not performed. Subsequent processes are similar to those shown in the flow chart in FIG. 3 and a description thereof will be omitted.

According to the present embodiment, mutual authentication can be properly performed among ECUs in a vehicle system after replacing an ECU without having to update electronic certificates stored in the ECU during the replacement of the ECU. In other words, a work load during ECU replacement can be reduced.

In the present embodiment, since distribution of an electronic certificate and a verification process of the electronic certificate are required in an initial mutual authentication process after replacing an ECU, the number of steps increases and more time is required until authentication is completed. However, after distribution (registration) of the electronic certificate is completed, a mutual authentication process can be performed with similar process contents to the first embodiment.

While an example in which mutual authentication is performed using a digest value of an execution program in a similar manner to the first embodiment has been described above, the present embodiment can also be applied to the second embodiment in which mutual authentication is performed using a secure boot technique and an identifier of an ECU.

In addition, while an example of timing of replacing an ECU has been described above, an electronic certificate of each ECU can be also registered using a similar method to that described above at timing of assembling a vehicle.

(Modifications)

The embodiments described above merely represent examples and the present invention can be implemented with various modifications without departing from the spirit and scope of the invention.

For example, while the execution program 111 of an ECU is stored in the ROM 110 in the description given above, the execution program may instead be stored in the flash memory (readable/writable memory) 130. This is because, although storing a program in a flash memory makes the program relatively more vulnerable to tampering, even if the program is tampered with, the tampering can be detected by an authentication process using a program digest value.

In addition, while only a session key to be transmitted from a master ECU to a general ECU is transmitted after being encrypted in the description given above, all of the messages transmitted among ECUs in a mutual authentication process may be transmitted after encryption. Specifically, by transmitting transmission data after encryption using a public key of a communication partner, only the communication partner can read the transmission data.

Furthermore, while the random numbers $r_m$ and $r_a$ are used in the description given above, these random numbers are used to ensure that a message transmitted upon authentication is for a present session and the random numbers need not necessarily be used.

Figure 8:
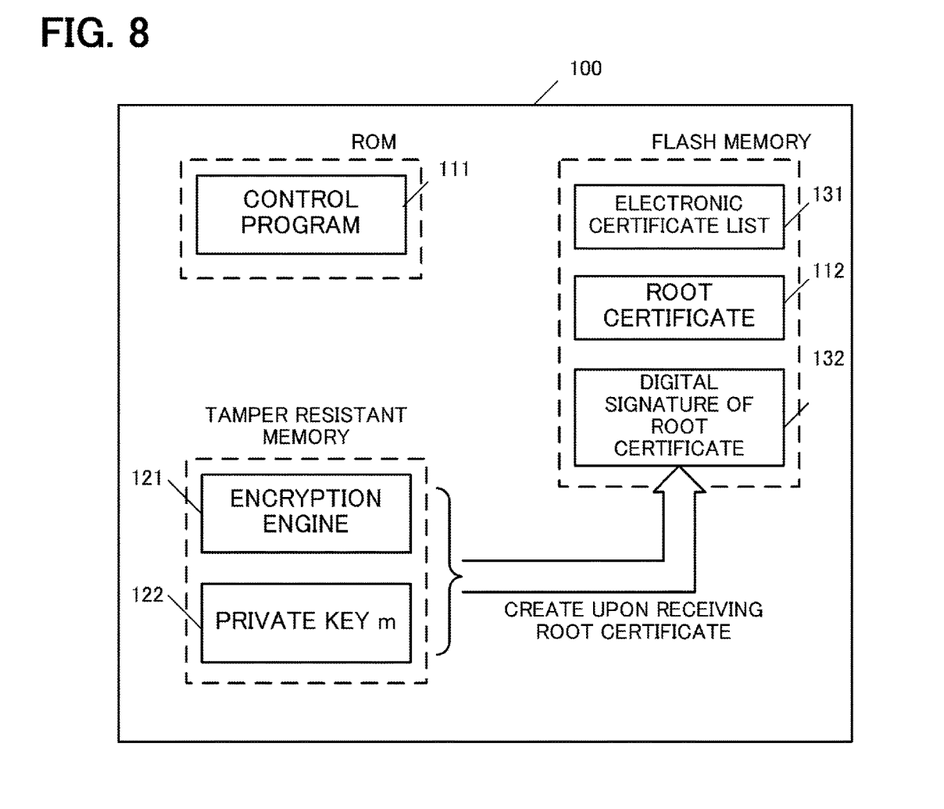
FIG. 8 is a diagram showing a functional configuration of an ECU according to a modification.

Moreover, while a root certificate is stored in a ROM in consideration of the fact that the root certificate need not be updated in the description given above, a root certificate may be stored in a flash memory in order to accommodate an update of a private key by a root certificate authority. A configuration in this case is shown in FIG. 8. As shown in FIG. 8, a root certificate 112 is stored in a flash memory. Since there is a risk that the root certificate 112 stored in the flash memory may be tampered with, in this case, when accepting (storing) the root certificate 112, a digital signature 132 of the root certificate is created using a private key 122 of an ECU and stored in the flash memory. Accordingly, the ECU can confirm that the root certificate 112 is valid. Another method of accommodating an update of a root certificate is to store the root certificate in a secure storage.

In addition, while an example in which only one master ECU exists in a vehicle system has been described above, a plurality of master ECUs may exist in the vehicle system. In this case, each master ECU may form a unique group and use a unique session key in the group or a same session key may be used by all of the groups. Furthermore, a configuration of a master ECU and general ECUs may be constructed with three or more tiers, in which the master ECU in the top tier may perform mutual authentication with the ECUs in the tier below to share a session key, and the master ECU in the second tier may perform mutual authentication with the ECUs in the tier below. Accordingly, the load on the master ECUs can be distributed and, at the same time, the time required to confirm the soundness of the entire vehicle system can be reduced. Moreover, a similar method can be used when a master ECU is not adopted and respective ECUs perform mutual authentication and share a session key on a one-on-one basis.

What is claimed is:

1. A vehicle system comprising a master Electronic Control Unit (ECU) and a general ECU,
the master ECU being provided with, by a management device different from the master ECU and the general ECU:
a private key of the master ECU; and
an electronic certificate of the general ECU which includes a public key of the general ECU and specified data related to an execution program stored in the general ECU; and
the general ECU being provided with, by the management device:
a private key of the general ECU; and
an electronic certificate of the master ECU which includes a public key of the master ECU and specified data related to an execution program stored in the master ECU, wherein:
the general ECU is configured to:
attach a first digital signature using the private key of the general ECU to first transmission data including generated specified data of the general ECU, and
transmit the first transmission data to the master ECU;
the master ECU is configured to:
verify, using the electronic certificate of the general ECU, the first transmission data attached with the first digital signature and transmitted from the general ECU,
verify whether the generated specified data included in the first transmission data matches the specified data included in the electronic certificate of the general ECU,
when the generated specified data included in the first transmission data matches the specified data included in the electronic certificate of the general ECU, determine that the general ECU and the execution program stored in the general ECU are valid,
attach a second digital signature using the private key of the master ECU to second transmission data including generated specified data of the master ECU and a session key, and
transmit the second transmission data to the general ECU; and
the general ECU is configured to:
verify, using the electronic certificate of the master ECU, the second transmission data attached with the second digital signature and transmitted from the master ECU,
verify whether the generated specified data included in the second transmission data matches the specified data included in the electronic certificate of the master ECU,
when the generated specified data included in the second transmission data matches the specified data included in the electronic certificate of the master ECU, determine that the master ECU and the execution program stored in the master ECU are valid, and
use the session key included in the second transmission data as a common key when performing subsequent communications.

2. The vehicle system according to claim 1, wherein:
the general ECU exists in plurality;
the master ECU is provided with an electronic certificate of each of the plurality of the general ECUs;
the master ECU is configured to transmit a same key as the session key to each respective one of the plurality of the general ECUs; and
the plurality of the general ECUs are configured to use the session key as the common key for communication with the master ECU and for communication with each other.

3. The vehicle system according to claim 1, wherein:
the specified data included in the electronic certificate of the general ECU is a valid digest value of the execution program stored in the general ECU;
the specified data included in the electronic certificate of the master ECU is a valid digest value of the execution program stored in the master ECU; and
the general ECU and the master ECU are each configured to calculate a digest value of an execution program stored in respective devices as the generated specified data of the respective devices, attach a digital signature to transmission data including the calculated digest value, and transmit the transmission data.

4. The vehicle system according to claim 1, wherein
the specified data included in the electronic certificate of the general ECU includes an ID of the general ECU;
the specified data included in the electronic certificate of the master ECU includes an ID of the master ECU; and
the general ECU and the master ECU are each configured to attach a digital signature to transmission data including the ID of respective devices, and transmit the transmission data after confirming integrity of the execution program stored in the respective devices using a secure boot.

5. The vehicle system according to claim 1, wherein
the master ECU and the general ECU are each configured to store a root public key that is a public key of a root certificate authority in an unrewritable memory.

6. The vehicle system according to claim 1, wherein
the master ECU and the general ECU are each configured to:
store a root public key that is a public key of a root certificate authority in a rewritable memory, and
when storing the root public key in the rewritable memory, store the root public key in association with a digital signature created using the private key of the master ECU or the private key of the general ECU.

7. The vehicle system according to claim 1, wherein:
the master ECU is provided with the electronic certificate of the master ECU, and the general ECU is provided with the electronic certificate of the general ECU;
when the general ECU does not have the electronic certificate of the master ECU:
the general ECU transmits the electronic certificate of the general ECU together with the first transmission data attached with the first digital signature, to the master ECU, and
the master ECU verifies the electronic certificate of the general ECU transmitted from the general ECU using a root public key, and stores the electronic certificate of the general ECU when the electronic certificate of the general ECU is valid; and
when the master ECU does not have the electronic certificate of the general ECU:
the master ECU transmits the electronic certificate of the master ECU together with the second transmission data attached with the second digital signature, to the general ECU, and
the general ECU verifies the electronic certificate of the master ECU transmitted from the master ECU using the root public key and stores the electronic certificate of the master ECU when the electronic certificate of the master ECU is valid.

8. An authentication method in a vehicle system constituted by a master Electronic Control Unit (ECU) and a general ECU,
the master ECU being provided with, by a management device different from the master ECU and the general ECU:
a private key of the master ECU; and
an electronic certificate of the general ECU which includes a public key of the general ECU and specified data related to an execution program stored in the general ECU; and
the general ECU being provided with, by the management device:
a private key of the general ECU; and
an electronic certificate of the master ECU which includes a public key of the master ECU and specified data related to an execution program stored in the master ECU,
the authentication method comprising steps of:
causing the general ECU to:
attach a first digital signature using the private key of the general ECU to first transmission data including generated specified data of the general ECU, and
transmit the first transmission data to the master ECU;
causing the master ECU to:
verify, using the electronic certificate of the general ECU, the first transmission data attached with the first digital signature and transmitted from the general ECU,
verify whether the generated specified data included in the first transmission data matches the specified data included in the electronic certificate of the general ECU,
when the generated specified data included in the first transmission data matches the specified data included in the electronic certificate of the general ECU, determine that the general ECU and the execution program stored in the general ECU are valid;
attach a second digital signature using the private key of the master ECU to second transmission data including generated specified data of the master ECU and a session key, and
transmit the second transmission data to the general ECU; and
causing the general ECU to:
verify, using the electronic certificate of the master ECU, the second transmission data attached with the second digital signature and transmitted from the master ECU,
verify whether the generated specified data included in the second transmission data matches the specified data included in the electronic certificate of the master ECU,
when the generated specified data included in the second transmission data matches the specified data included in the electronic certificate of the master ECU, determine that the master ECU and the execution program stored in the master ECU are valid, and
use the session key included in the second transmission data as a common key when performing subsequent communications.

9. The authentication method according to claim 8, wherein:
the general ECU exists in plurality;
the master ECU is provided with an electronic certificate of each of the plurality of the general ECUs;
the master ECU transmits a same key as the session key to each respective one of the plurality of the general ECUs; and
the plurality of the general ECUs use the session key as the common key for communication with the master ECU and for communication with each other.

10. The authentication method according to claim 8, wherein:
the specified data included in the electronic certificate of the general ECU is a valid digest value of the execution program stored in the general ECU;
the specified data included in the electronic certificate of the master ECU is a valid digest value of the execution program stored in the master ECU; and
the general ECU and the master ECU each calculate a digest value of an execution program stored in respective devices as the generated specified data of the respective devices, attach a digital signature to transmission data including the calculated digest value, and transmit the transmission data.

11. The authentication method according to claim 8, wherein:
the specified data included in the electronic certificate of the general ECU includes an ID of the general ECU;

the specified data included in the electronic certificate of the master ECU includes an ID of the master ECU; and the general ECU and the master ECU each attach a digital signature to transmission data including the ID of respective devices, and transmit the transmission data after confirming integrity of the execution program stored in the respective devices using a secure boot.

12. The authentication method according to claim 8, wherein:

the master ECU is provided with the electronic certificate of the master ECU, and the general ECU is provided with the electronic certificate of the general ECU;

when the general ECU does not have the electronic certificate of the master ECU:

the general ECU transmits the electronic certificate of the general ECU together with the first transmission data attached with the first digital signature, to the master ECU, and the master ECU verifies the electronic certificate of the general ECU transmitted from the general ECU using a root public key, and stores the electronic certificate of the general ECU when the electronic certificate of the general ECU is valid; and when the master ECU does not have the electronic certificate of the general ECU:

the master ECU transmits the electronic certificate of the master ECU together with the second transmission data attached with the second digital signature, to the general ECU, and the general ECU verifies the electronic certificate of the master ECU transmitted from the master ECU using the root public key, and stores the electronic certificate of the master ECU when the electronic certificate of the master ECU is valid.

13. A non-transitory computer-readable medium storing a program causing a computer to execute the steps of the authentication method according to claim 8.

* * * * *